United States Patent
Shin

(10) Patent No.: US 9,031,773 B2
(45) Date of Patent: May 12, 2015

(54) APPARATUS AND METHOD FOR DETECTING NARROW ROAD IN FRONT OF VEHICLE

(71) Applicant: Hyundai Motor Company, Seoul (KR)

(72) Inventor: Ki Cheol Shin, Seongnam-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/105,103

(22) Filed: Dec. 12, 2013

(65) Prior Publication Data

US 2015/0019119 A1    Jan. 15, 2015

(30) Foreign Application Priority Data

Jul. 11, 2013 (KR) .................. 10-2013-0081441

(51) Int. Cl.
*G01C 21/26* (2006.01)
(52) U.S. Cl.
CPC ........................... *G01C 21/26* (2013.01)
(58) Field of Classification Search
USPC ................. 701/300, 301, 201, 210
See application file for complete search history.

(56) References Cited

U.S. PATENT DOCUMENTS

| | | | |
|---|---|---|---|
| 2009/0299626 A1* | 12/2009 | Denaro .......................... | 701/209 |
| 2011/0218724 A1* | 9/2011 | Iida ................................ | 701/70 |
| 2012/0271483 A1* | 10/2012 | Samukawa et al. ............... | 701/1 |
| 2013/0335569 A1* | 12/2013 | Einecke et al. ................ | 348/148 |
| 2014/0149014 A1* | 5/2014 | Grothe et al. ................... | 701/93 |

FOREIGN PATENT DOCUMENTS

| | | |
|---|---|---|
| JP | 2008-143263 A | 6/2008 |
| JP | 2011-230563 A | 11/2011 |
| JP | 2013-037601 A | 2/2013 |
| KR | 10-1998-047789 A | 9/1998 |
| KR | 10-2012-0036440 A | 4/2012 |
| KR | 20130040101 A | 4/2013 |
| KR | 20130071240 A | 6/2013 |

* cited by examiner

*Primary Examiner* — Mary Cheung
*Assistant Examiner* — Rodney Butler
(74) *Attorney, Agent, or Firm* — McDermott Will & Emery LLP

(57) ABSTRACT

An apparatus for detecting a narrow road in front of a vehicle includes: a narrow road determination processor configured to generate circular arcs passing between obstacles, select a circular arc closest to the middle of the obstacles among the generated circular arcs, and generate an offset curve which is a circular arc having the same central point as the selected circular arc and contacting a corresponding obstacle at left/right sides of the selected circular arc, based on driving information and specification information of the vehicle, and then to determine that a road is a narrow road when a width between the two offset curves does not exceed a threshold value.

13 Claims, 12 Drawing Sheets

APPARATUS AND METHOD FOR DETECTING NARROW ROAD IN FRONT OF VEHICLE

CROSS-REFERENCE TO RELATED APPLICATION

This application is based on and claims priority to Korean Patent Application No. 10-2013-0081441, filed on Jul. 11, 2013 in the Korean Intellectual Property Office, the disclosure of which is incorporated herein in its entirety by reference.

BACKGROUND OF THE DISCLOSURE

1. Field of the Disclosure

The present disclosure relates to an apparatus and method for detecting a narrow road in front of a vehicle, and more particularly, for detecting a narrow road through which a vehicle cannot pass, based on detected positions of obstacles using a LiDAR.

In the present disclosure, a circular arc embodies an arc of a circle and a central point embodies a central point of the circle.

Further, in the present disclosure, a road embodies an alley, a general road, and the like, which can be defined without a lane.

2. Description of Related Art

Generally, a width of a road is designed to allow a vehicle to comfortably pass through.

However, when obstacles (e.g., other vehicles, and the like) are located at edge(s) of one side or both sides of a road, the width of the road becomes more narrow, such that a driver must pass through the road by visually judging the width of the road, while looking at the left and right sides of the vehicle.

As a result, when an actual width of a road is narrower than that of a vehicle body, a fender-bender with obstacles may occur due to an incorrect judgment by a driver.

To solve the above problems, there has been proposed a technology by which a width of a narrow road is sensed by mounting rotating sensors in a central part of the front of a vehicle body.

However, such a technology according to the related art detects a width of a narrow road by using a sensor which merely rotates to the left and right, and therefore may not accurately detect the width of the narrow road when the narrow road is, e.g., a curved line rather than a straight line.

SUMMARY OF THE DISCLOSURE

Accordingly, the present disclosure has been made to solve the above-mentioned problems occurring in the related art while making it possible to maintain the advantages that can be achieved thereby.

According to one aspect of the present disclosure, there is provided an apparatus and a method for detecting a narrow road in front of a vehicle capable of preventing a driver from passing through a narrow road so as to prevent a fender-bender with obstacles by previously detecting the narrow road through which a vehicle cannot pass, based on positions with obstacles collected by using, e.g., a LiDAR.

The foregoing and other objects, features, aspects and advantages of the present disclosure will be understood and become more apparent from the following detailed description of the present disclosure.

In one aspect of the present disclosure, there is provided an apparatus for detecting a narrow road in front of a vehicle, including: a driving information collector configured to collect driving information and specification information of the vehicle; a position sensor configured to sense positions of obstacles at both sides of a road in front of the vehicle; a narrow road determination processor configured to generate circular arcs passing between the obstacles, select a circular arc closest to the middle of the obstacles among the generated circular arcs, and generate an offset curve which is a circular arc having the same central point as the selected circular arc and contacting a corresponding obstacle at left/right sides of the selected circular arc, based on the driving information and the specification information of the vehicle, and then to determine that a road is a narrow road when a width between the two offset curves does not exceed a threshold value; and a narrow road informer configured to inform a driver that there is a narrow road in front of the vehicle.

In another aspect of the present disclosure, there is provided a method for detecting a narrow road in front of a vehicle, including: collecting, by a driving information collector, driving information and specification information of a vehicle; sensing, by a position sensor, positions of obstacles at both sides of a road in front of the vehicle; generating, by a narrow road determination processor, circular arcs passing between the obstacles; selecting, by the narrow road determination processor, a circular arc closest to the middle of the obstacles among the generated circular arcs; generating, by the narrow road determination processor, an offset curve which is a circular arc having the same central point as the selected circular arc and contacting a corresponding obstacle at left/right sides of the selected circular arc, based on the driving information and the specification information of the vehicle; determining, by the narrow road determination processor, that a road is a narrow road when a width between the two offset curves does not exceed a threshold value; and informing a driver that there is a narrow road in front of the vehicle.

BRIEF DESCRIPTION OF THE DRAWINGS

The above and other objects, features and advantages of the present disclosure will be more apparent from the following detailed description taken in conjunction with the accompanying drawings, in which.

DETAILED DESCRIPTION OF EXEMPLARY EMBODIMENTS

The foregoing objects, features and advantages will become more apparent from the following description of exemplary embodiments of the present disclosure with reference to the accompanying drawings, which are set forth hereinafter. Accordingly, those having ordinary skill in the related art to which the present disclosure pertains will easily understand the technical ideas or spirit of the present disclosure. Further, unnecessary descriptions of technical configurations known in the related art will be omitted for purposes of brevity. Hereinafter, exemplary embodiments of the present disclosure will be described in detail with reference to the accompanying drawings.

Figure 1:
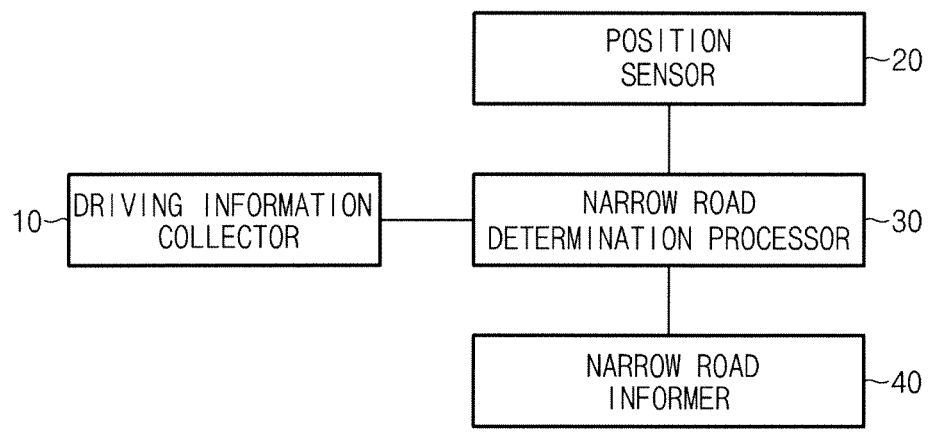
FIG. 1 is a block diagram of an apparatus for detecting a narrow road in front of a vehicle according to an exemplary embodiment of the present disclosure.

FIG. 1 is a block diagram of an apparatus for detecting a narrow road in front of a vehicle according to an exemplary embodiment of the present disclosure.

As illustrated in FIG. 1, the apparatus for detecting a narrow road in front of a vehicle includes a driving information collector 10, a position sensor 20, a narrow road determination processor 30, and a narrow road informer 40.

The driving information collector 10 collects, e.g., a speed and a steering angle of a vehicle as driving information.

The driving information collector 10 may communicate with an electronic control unit (ECU) to collect driving information and/or may directly collect the driving information through a vehicle communication network.

Herein, the vehicle communication network includes a controller area network (CAN), a local interconnect network (LIN), a FlexRay, a media oriented system transport (MOST), and the like.

Further, the driving information collector 10 may also collect specification information of a vehicle (e.g., length, width, minimum rotating radius, maximum steering angle, and the like, etc.).

Next, a position sensor 20 which can sense positions (e.g., a distance from a vehicle to obstacles, coordinates of obstacles) of obstacles which are present at both sides of a road in front of a vehicle, preferably uses, for example, a light detection and ranging (LiDAR) sensor, but is not limited thereto.

For reference, a LiDAR sensor has a higher sensing accuracy in a transverse direction than a radio detecting and ranging (RaDAR) sensor, such that the accuracy of determining whether a pathway is present in front of a vehicle can be relatively improved using a LiDAR sensor.

Figure 5:
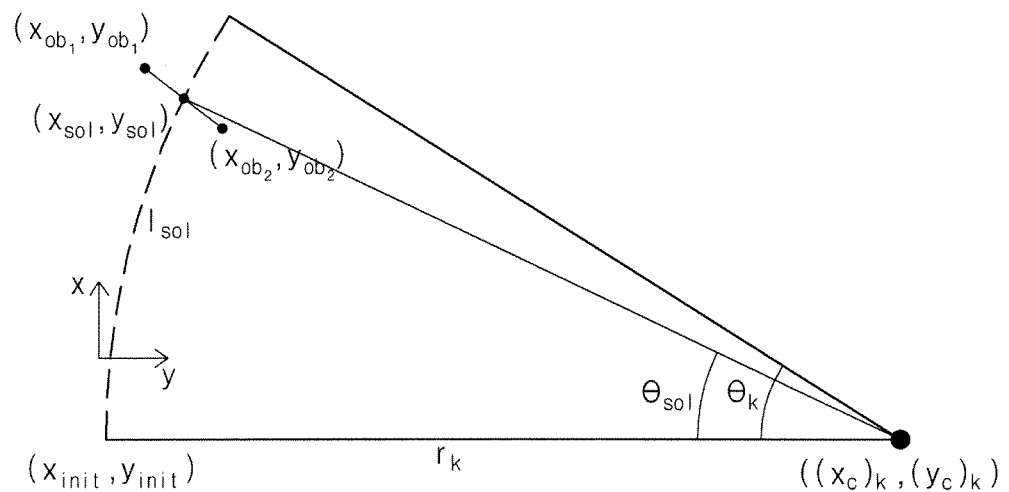
FIG. 5 is a diagram illustrating a process by which a candidate group extractor extracts circular arcs which do not contact obstacles according to an exemplary embodiment of the present disclosure.

Further, the obstacles sensed by the position sensor 20 are represented by a dot and line form, as illustrated in FIG. 5.

Next, the narrow road determination processor 30, which can be a controller, serves to control the apparatus for detecting a narrow road in front of a vehicle and performs the following functions.

The narrow road determination processor 30 generates circular arcs passing between obstacles, selects a circular arc closest to the middle of the obstacles among the generated circular arcs, and generates an offset curve which is a circular arc having the same central point as the selected circular arc and contacting a corresponding obstacle at left/right sides of the selected circular arc, based on the driving information and the specification information of a vehicle collected by the driving information collector 10, and then determines that a road is a narrow road when a width between two offset curves does not exceed a threshold value.

For example, the narrow road determination processor generates a plurality of circular arcs of which the lengths drawn in front of a vehicle are different from each other while setting a center of a rear wheel of a vehicle to 0°, calculates a narrow road detecting region, and extracts circular arcs (hereinafter, candidate group) which do not contact obstacles within the calculated narrow road detecting region.

The narrow road determination processor 30 then selects a circular arc from the extracted candidate group closest to the middle of the obstacles at both sides of a road.

The narrow road determination processor 30 generates an offset curve, which is a circular arc contacting the obstacles at left and right sides of the selected circular arc, based on the same central point as the selected circular arc, and then calculates the width between the two offset curves.

Further, the narrow road determination processor 30 determines that a road is a narrow road when the calculated width does not exceed the threshold value.

Next, when the narrow road determination processor 30 determines that a road in front of a vehicle is a narrow road, the narrow road informer 40 informs the driver of the narrow road. To do so, the narrow road informer 40 may use an audio, video, and navigation (AVN) system to inform the driver of the presence of the narrow road with a sound and/or through a message on a screen.

Figure 2:
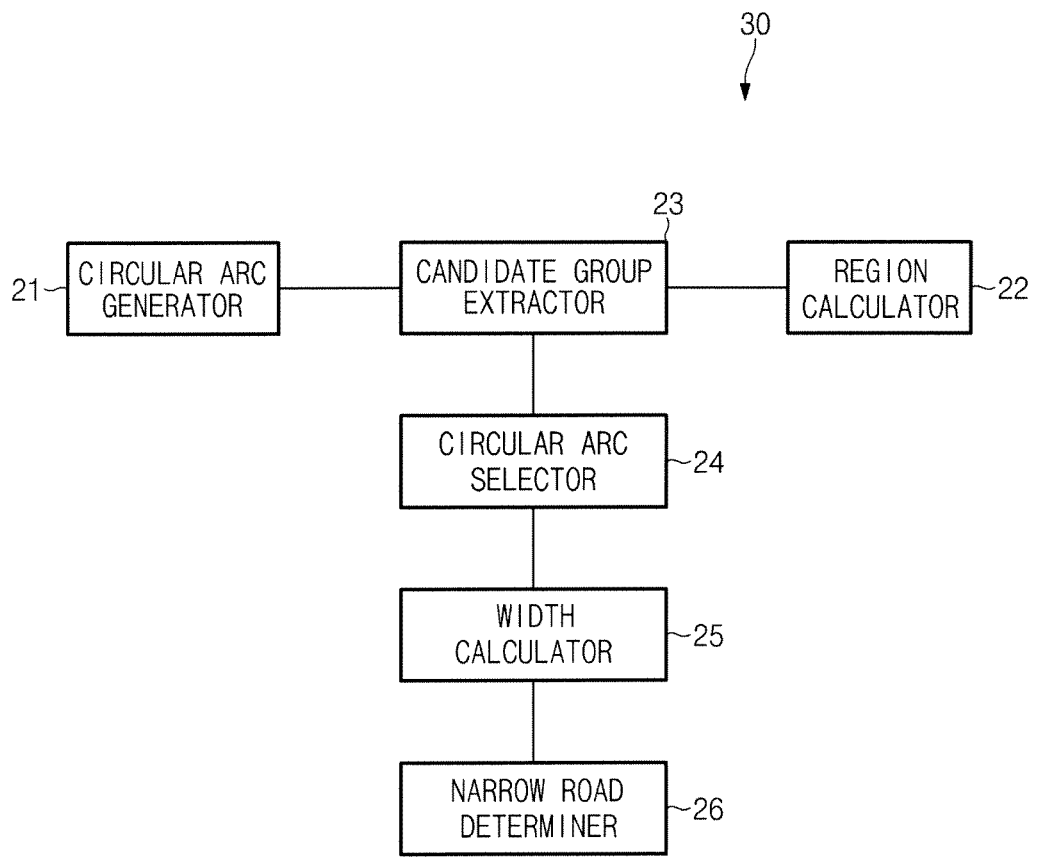
FIG. 2 is a detailed block diagram of a narrow road determination processor within the apparatus for detecting a narrow road in front of a vehicle according to an exemplary embodiment of the present disclosure.

FIG. 2 is a detailed block diagram of a narrow road determination processor within the apparatus for detecting a narrow road in front of a vehicle according to an exemplary embodiment of the present disclosure.

As illustrated in FIG. 2, the narrow road determination processor 30 includes a circular arc generator 21, a region calculator 22, a candidate group extractor 23, a circular arc selector 24, a width calculator 25, and a narrow road determiner 26.

The circular arc generator 21 generates a plurality of circular arcs in which the center (middle) of the rear wheel of a vehicle is set to be 0°. In this case, the arc generator 21 may generate a plurality of circular arcs by considering the kinematics of a vehicle based on the specification information of the vehicle collected by the driving information collector 10.

Hereinafter, a process by which the circular arc generator 21 generates the plurality of circular arcs will be described in detail with reference to FIGS. 3A to 3C.

Figure 3A:
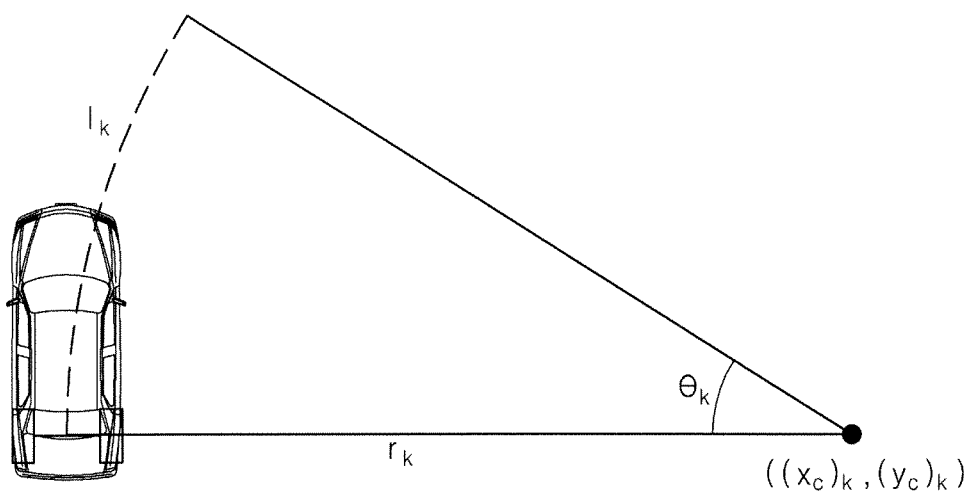
FIGS. 3A to 3C are diagrams illustrating a process by which a circular arc generator generates a circular arc according to an exemplary embodiment of the present disclosure.

As illustrated in FIG. 3A, the circular arc generator 21 generates the plurality of circular arcs such that the center of the rear wheel of the vehicle is set to 0°. That is, all the generated circular arcs meet a tangent line between the rear wheel and a starting point of the circular arcs.

In this case, a radius $r_k$ of all the generated circular arcs is taken as a maximum radius relative to a vehicle position. Further, generation of the circular arc, having a radius $r_k$ with a central point $x_c(k)$, $y_c(k)$ and having a length $l_k$, depends on an equation of the circular arc which is drawn in front of a vehicle.

Figure 3B:
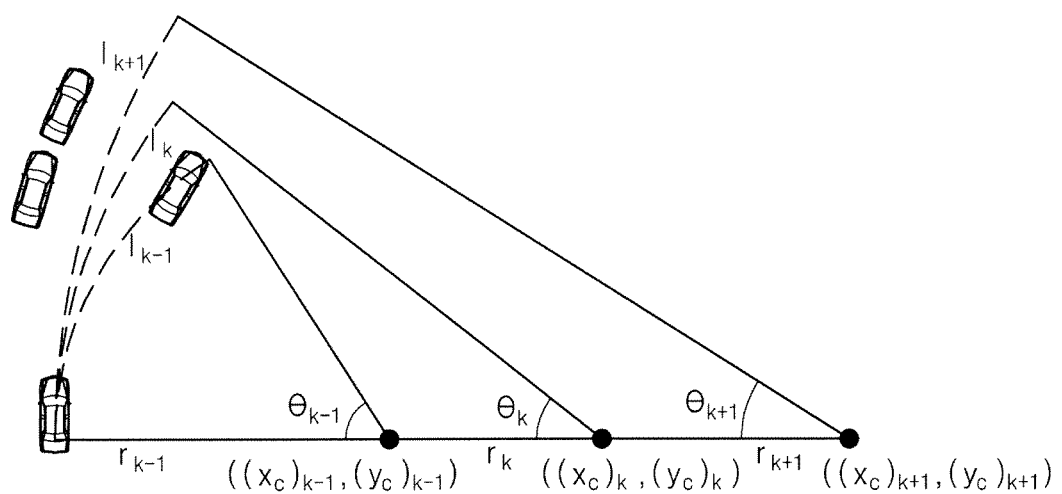

That is, the circular arc generator 21 generates the plurality of circular arcs having different lengths $l_k$ while setting the rear wheel of the vehicle to 0° based on the following Equation 1, as illustrated in FIG. 3B.

$$l_k = l_0 + vT_k \qquad \text{[Equation 1]}$$

In Equation 1, $l_0$ is a constant representing a minimum length of the circular arc, v is a current speed of a vehicle, and $T_k$ is a variable determining the length of the circular arc and is arbitrarily set by a designer. Therefore, when the value of $T_k$ is increased, the length of the circular arc is increased and when the value of $T_k$ is decreased, the length of the circular arc is decreased.

For example, when $_k=1$ in the state in which v is constant, $l_1=l_0+vT_1$, and when $_k=2$, $l_2=l_0+vT_2$. In this case, $T_1 \neq T_2$ and thus $l_1 \neq l_2$.

Consequently, a plurality of circular arcs having different lengths, while setting the center (middle) of the rear wheel of the vehicle to 0°, are arranged as illustrated in FIG. 3B.

For reference, since a road, which is an object of determination as to whether the road is a narrow road, is an alley or a general road on which a lane is not drawn, the circular arc generator 21 generates only arcs which contact obstacles on an alley or a road, or which pass between the obstacles.

Next, the region calculator 22 calculates a region for detecting a narrow road. That is, the region calculator 22 calculates a region by adding a threshold angle to a safety distance $l_s$ which is calculated based on the following Equation 2. Herein, the threshold angle is a value within an angle (180°) which represents a front of a vehicle. In an exemplary embodiment of the present disclosure described herein, the threshold angle is, for example, 90°.

$$l_s = l_m + vt + \frac{1}{2}at^2 \qquad \text{[Equation 2]}$$

In the above Equation 2, $l_m$ is a constant which represents a margin length, v represents a speed of a vehicle, t is a constant which is set by a designer, and a represents deceleration.

Figure 3C:
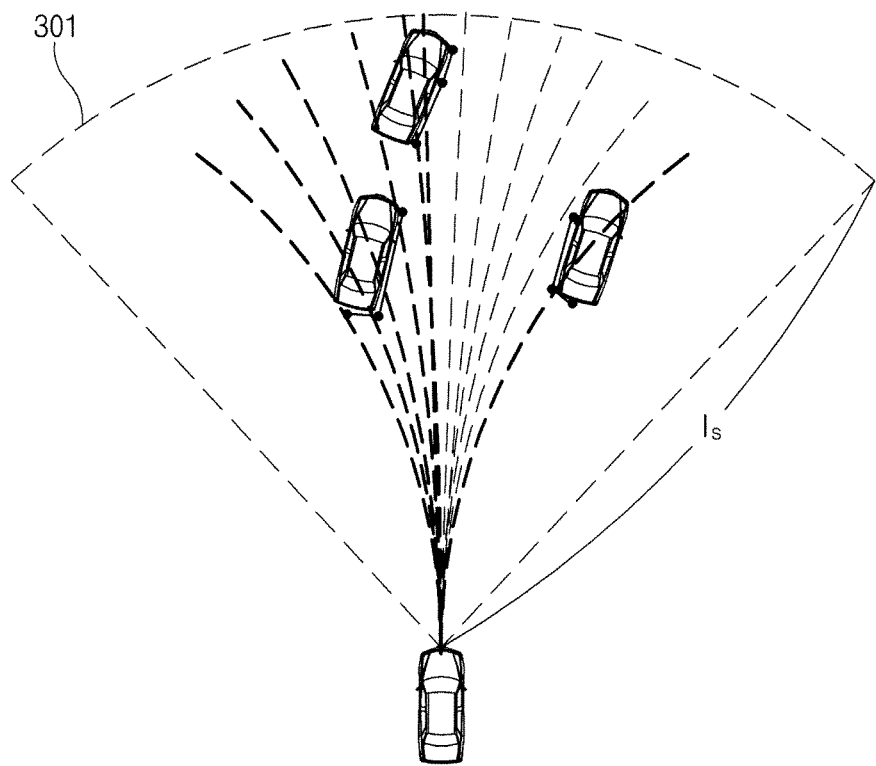

The region calculator 22 adds the threshold angle to the safety distance ls to calculate a region 301, as illustrated in FIG. 3C.

Figure 4:
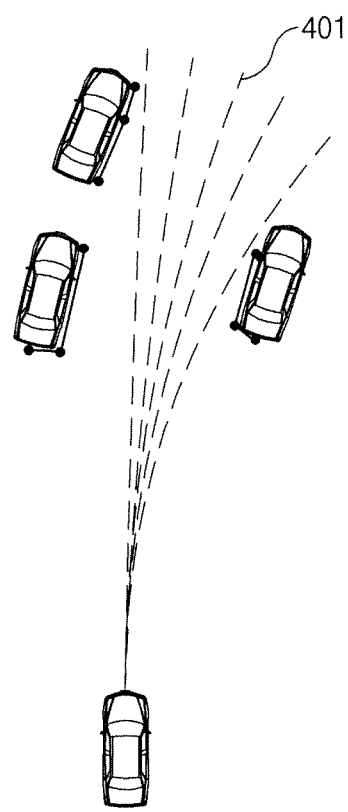
FIG. 4 is a diagram illustrating a candidate group calculator according to an exemplary embodiment of the present disclosure.

Next, the candidate group extractor 23 extracts the circular arcs (hereinafter, candidate group) which do not contact an obstacle within the region 301 calculated by the region calculator 22. The extracted candidate group is illustrated in FIG. 4.

A process by which the candidate group extractor 23 extracts the candidate group will be described with reference to FIG. 5.

As illustrated in FIG. 5, an obstacle sensed by the position sensor 20 is represented by a line which connects point $X_{ob1}$, $y_{ob1}$ to point $X_{ob2}$, $Y_{ob2}$.

A contact point $x_{sol}, y_{sol}$ with the circular arc generated by the circular arc generator 21 based on an obstacle, that is, with the circular arc of which the central point is $(x_c)_k$, $y_c(_k)$ the radius is $r_k$, and the angle is $\theta_k$ from a center $x_{init}, y_{init}$ of the rear wheel shaft, is calculated by the following Equation 3.

$$y_{sol} = \left(\frac{y_{ob_2} - y_{ob_1}}{x_{ob_2} - x_{ob_1}}\right)x_{sol} + \left\{y_{ob_1} - \left(\frac{y_{ob_2} - y_{ob_1}}{x_{ob_2} - x_{ob_1}}\right)x_{ob_1}\right\} \qquad \text{[Equation 3]}$$

$$r_k^2 = (x_{sol} - x_c)_k^2 + (y_{sol} - y_c)_k^2$$

$$x_{ob_1} < x_{sol} < x_{ob_2}$$

$$y_{ob_1} < y_{sol} < y_{ob_2}$$

$$0 < \theta_{sol} < \theta_k$$

The candidate group extractor 23 extracts the circular arcs which do not satisfy the above Equation 3, as the candidate group.

Next, the circular arc selector 24 selects a circular arc 401 closest to the center (middle) of the obstacles at both sides of the vehicle from the candidate group extracted by the candidate group extractor 23.

Next, the width calculator 25 generates an offset curve, which is a circular arc having the same central point as the circular arc 401 and contacting a corresponding obstacle, at the left/right sides of the circular arc 401 selected by the circular arc selector 24, and then calculates a width between the two offset curves.

Figure 6A:
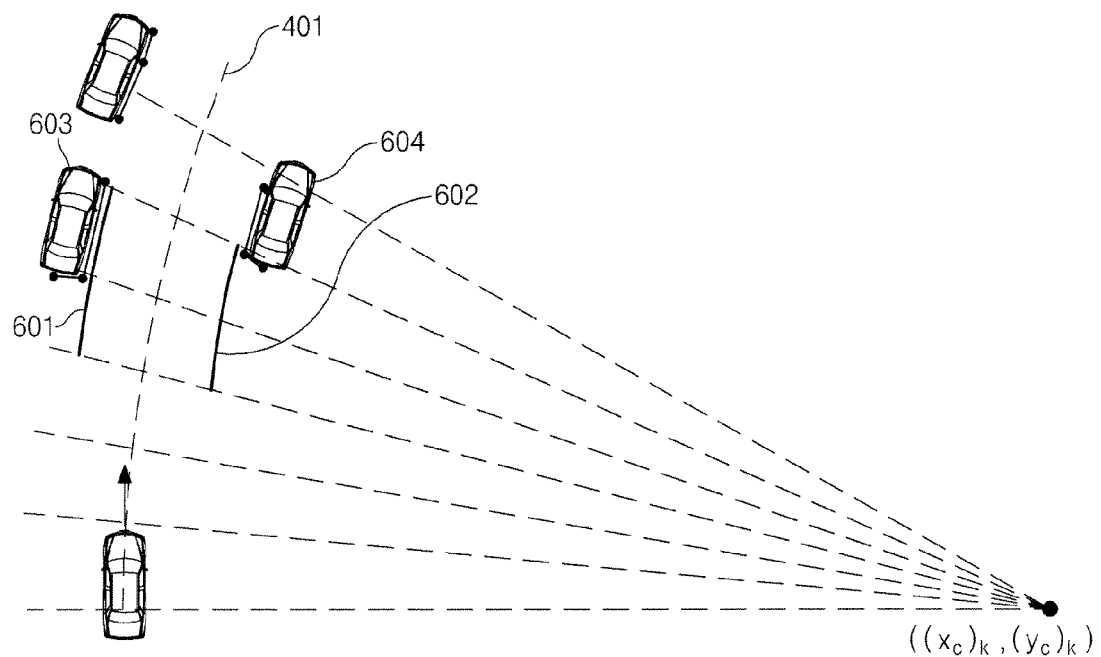
FIGS. 6A and 6B are diagrams illustrating a process by which a width calculator calculates a width between two offset curves according to an exemplary embodiment of the present disclosure.
Figure 6B:
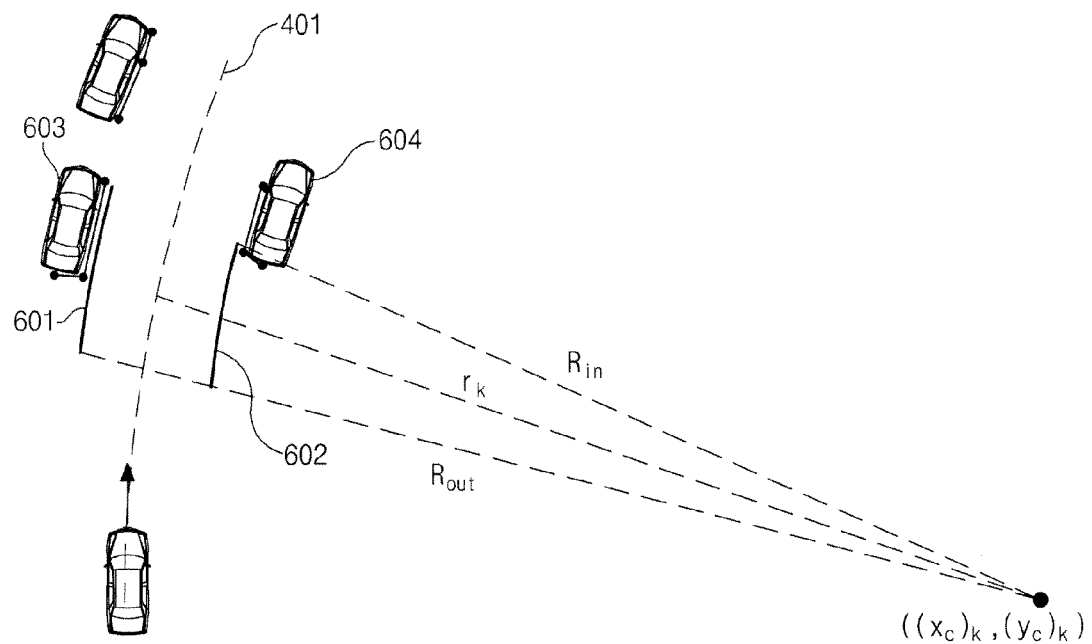

Referring to FIGS. 6A and 6B, an exemplary process by which the width calculator 25 calculates the width between the two offset curves will be described in detail.

First, as illustrated in FIG. 6A, the width calculator 25 selects a segment of the circular arc 401 having a predetermined angle (for example, 3°, 5°, 7°, 10°, and the like) with respect to the central point $x_c(_k), y_c(_k)$.

The width calculator 25 generates offset curves 601 and 602, which are new arcs sequentially contacting obstacles at left/right sides of the circular arc 401 from a section close to a vehicle.

That is, the width calculator 25 generates a first offset curve 601, which is a circular arc having the same central point as the circular arc 401 and contacting an obstacle 603 at the left side (outside) of the circular arc 401, and generates a second offset curve 602, which is a circular arc having the same central point as the circular arc 401 and contacting an obstacle 604 at the right side (inside) of the circular arc 401.

In this example, a radius $R_{out}$ of the first offset curve 601 is larger than the radius $r_k$ of the circular arc 401 selected by the circular arc selector 24, but is the smallest radius among the radii of arcs contacting the corresponding obstacle 603.

Further, a radius $R_{in}$ of the second offset curve 602 is smaller than the radius $r_k$ of the circular arc 401 selected by the circular arc selector 24, but is the largest radius among the radii of arcs contacting the corresponding obstacle 604.

The width calculator 25 uses the following Equation 4 to calculate a width W between the first offset curve 601 and the second offset curve 602.

$$W = |R_{out} - R_{in}| \qquad \text{[Equation 4]}$$

In the above Equation 4, '| |' means an absolute value.

The width calculator 25 generates the first offset curve 601, which is a circular arc having a minimum radius among arcs having the same central point as the circular arc 401 and contacting the first obstacle 603 at the left side of the circular arc 401, and generates the second offset curve 602, which is a circular arc having a maximum radius among arcs having the same central point as the circular arc 401 and contacting the second obstacle 604 at the right side of the circular arc 401. The width calculator 25 then calculates the width between the first offset curve 601 and the second offset curve 602.

Figure 7:
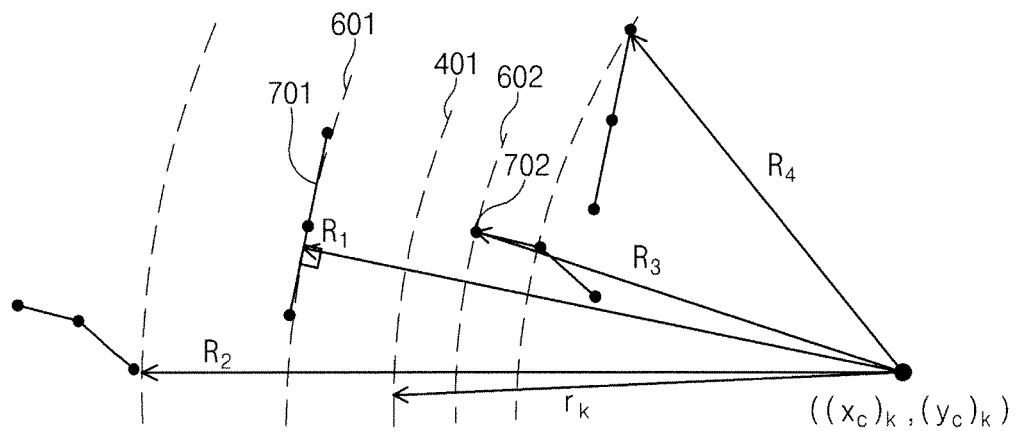
FIG. 7 is a diagram illustrating a width calculator according to an exemplary embodiment of the present disclosure.

As illustrated in FIG. 7, when the width calculator 25 generates the first offset curve 601, a distance between a line 701 representing an obstacle and the central point $(x_c)_k, (y_c)_k$ of the first offset curve 601 becomes a radius R1 of the first offset curve 601.

Further, as illustrated in FIG. 7, when the width calculator 25 generates the second offset curve 602, a distance between a point 702 representing an obstacle and the central point $(x_c)_k, (y_c)_k$ of the second offset curve 602 becomes a radius R3 of the second offset curve 602.

Figure 8:
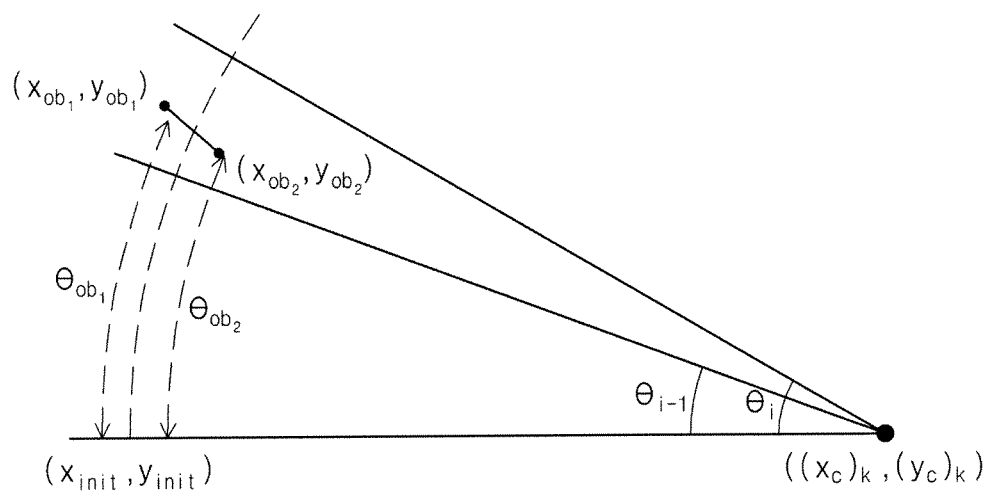
FIG. 8 is a diagram illustrating a process by which a width calculator determines whether obstacles are present in an arbitrary section according to an exemplary embodiment of the present disclosure.

A process by which the width calculator 25 determines whether an obstacle is included in any section will be described with reference to FIG. 8. The width calculator 25 determines that an obstacle is included in the corresponding section when the following Equation 5 is satisfied.

$$(\theta_{t-1} < \theta_{ob_1} < \theta_t) \text{ or } (\theta_{t-1} < \theta_{ob_2} < \theta_t) \quad \text{[Equation 5]}$$

Next, the narrow road determiner 26 determines that a road is a narrow road when the width calculated by the width calculator 25 does not exceed a threshold value. In this case, the threshold value becomes a value obtained by adding a margin length (for example, 50 cm) to the width of the vehicle.

Figure 9:
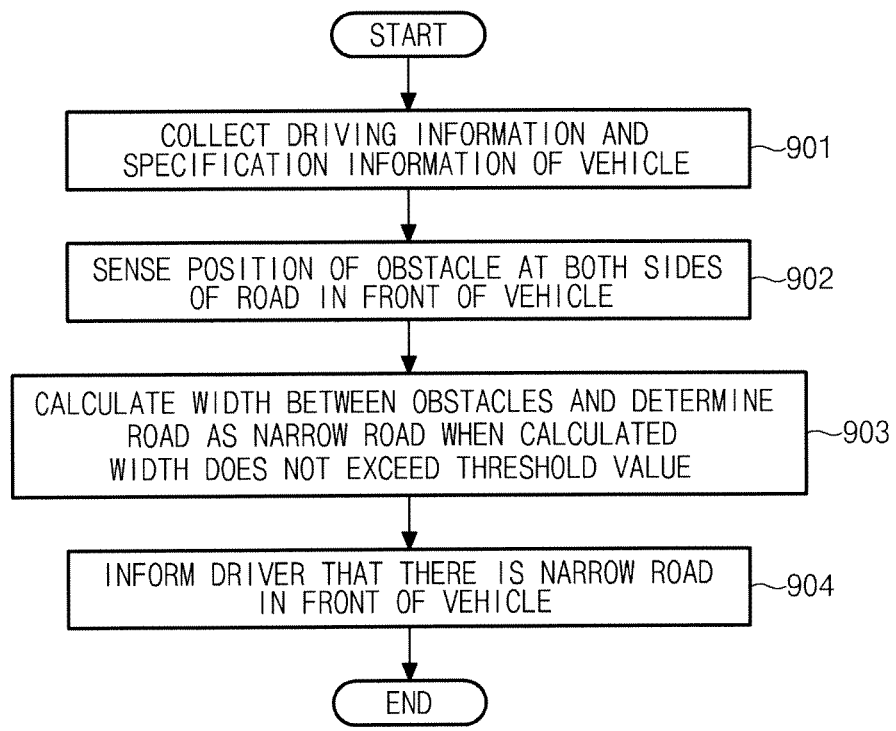
FIG. 9 is a flow chart of a method for detecting a narrow road in front of a vehicle according to an exemplary embodiment of the present disclosure.

FIG. 9 is a flow chart of a method for detecting a narrow road in front of a vehicle according to an exemplary embodiment of the present disclosure.

First, the driving information collector 10 collects the driving information and the specification information of the vehicle (901).

Next, the position sensor 20 senses the positions of the obstacles at both sides of a road in front of a vehicle (902).

Next, the narrow road determination processor 30 generates circular arcs passing between obstacles based on the driving information and specification information of a vehicle collected by the driving information collector 10, selects a circular arc closest to the middle of the obstacles among the generated circular arcs, and generates an offset curve which is a circular arc contacting the corresponding obstacle at left/right sides of the selected circular arc based on the same central point as the selected circular arc.

The narrow road determination processor 30 then determines that a road is a narrow road when a width between the two offset curves does not exceed a threshold value (903). When the width exceeds the threshold value, the process ends.

Next, the narrow road informer 40 informs the driver that there is a narrow road in front of the vehicle (904).

The method according to an exemplary embodiment of the present disclosure as described above may be prepared using a computer program. Codes and code segments configuring the computer program may be easily deduced by computer programmers in the art. The computer program may be stored in a non-transitory computer readable recording media (information storage media) and can be read and executed by a processor (e.g., computer, etc.), thereby implementing the methods according to the present disclosure. Further, the recording medium may include any type of recording media which may be read by a computer.

As described above, according to exemplary embodiments of the present disclosure, it is possible to prevent a driver from passing through a narrow road so as to avoid a fender-bender with obstacles, by previously detecting the narrow road through which the vehicle cannot pass based on the positions of obstacles collected by using, e.g., the LiDAR.

Further, according to exemplary embodiments of the present disclosure, it is possible to accurately detect the width of the narrow road even when the narrow road is a curved line, in addition to a straight line.

The present disclosure described above may be variously substituted, altered, and modified by those having ordinary skill in the art to which the present disclosure pertains without departing from the scope and spirit of the present disclosure. Therefore, the present disclosure is not limited to the above-mentioned exemplary embodiments and the accompanying drawings.

What is claimed is:

1. An apparatus for detecting a narrow road in front of a vehicle, comprising:
    a driving information collector configured to collect driving information and specification information of the vehicle;
    a position sensor configured to sense positions of obstacles at both sides of a road in front of the vehicle;
    a narrow road determination processor configured to generate circular arcs passing between the obstacles, select a circular arc closest to the middle of the obstacles among the generated circular arcs, and generate an offset curve which is a circular arc having the same central point as the selected circular arc and contacting a corresponding obstacle at left/right sides of the selected circular arc, based on the driving information and the specification information of the vehicle, and then to determine that a road is a narrow road when a width between the two offset curves does not exceed a threshold value; and
    a narrow road informer configured to inform a driver that there is a narrow road in front of the vehicle.

2. The apparatus according to claim 1, wherein the position sensor is a light detection and ranging (LiDAR) sensor.

3. The apparatus according to claim 1, wherein the threshold value is a value obtained by adding a margin length to a width of the vehicle.

4. The apparatus according to claim 1, wherein the narrow road determination processor includes:
    a circular arc generator configured to generate a plurality of circular arcs having different lengths drawn in front of the vehicle, and to set a center of a rear wheel shaft of the vehicle to 0°;
    a region calculator configured to calculate a narrow road detection region;
    a candidate group extractor configured to extract arcs which do not contact obstacles within the region calculated by the region calculator, the extracted arcs being a candidate group;
    a circular arc selector configured to select a circular arc closest to a middle of obstacles at both sides of the vehicle from the candidate group extracted by the candidate group extractor;
    a width calculator configured to generate an offset curve, which is a circular arc having the same central point as the selected arc and contacting a corresponding obstacle at left/right sides of the circular arc selected by the circular arc selector, and then to calculate a width between the two offset curves; and
    a narrow road determiner configured to determine that a road is a narrow road when the width calculated by the width calculator does not exceed the threshold value.

5. The apparatus according to claim 4, wherein the width calculator selects a segment of the selected circular arc having a predetermined angle with respect to a central point of the selected circular arc, and then generates the offset curves sequentially contacting the obstacles at left/right sides of the selected circular arc from a section close to the vehicle.

6. The apparatus according to claim 4, wherein the width calculator generates a first offset curve which has a minimum radius among radii of arcs having the same central point as the selected circular arc and contacting a first obstacle at the left side of the selected circular arc, and
    wherein the width calculator generates a second offset curve which has a maximum radius among radii of arcs having the same central point as the selected circular arc and contacting a second obstacle at the right side of the selected circular arc, and then calculates a width between the first offset curve and the second offset curve.

7. The apparatus according to claim 6, wherein the width calculator uses a distance between a line representing the first obstacle and a central point of the first offset curve to determine a radius of the first offset curve at the time of generating the first offset curve.

8. The apparatus according to claim 6, wherein the width calculator uses a distance between a point representing the second obstacle and a central point of the second offset curve to determine a radius of the second offset curve at the time of generating the second offset curve.

9. A method for detecting a narrow road in front of a vehicle, comprising:
  collecting, by a driving information collector, driving information and specification information of a vehicle;
  sensing, by a position sensor, positions of obstacles at both sides of a road in front of the vehicle;
  generating, by a narrow road determination processor, circular arcs passing between the obstacles;
  selecting, by the narrow road determination processor, a circular arc closest to the middle of the obstacles among the generated circular arcs;
  generating, by the narrow road determination processor, an offset curve which is a circular arc having the same central point as the selected circular arc and contacting a corresponding obstacle at left/right sides of the selected circular arc, based on the driving information and the specification information of the vehicle;
  determining, by the narrow road determination processor, that a road is a narrow road when a width between the two offset curves does not exceed a threshold value; and
  informing a driver that there is a narrow road in front of the vehicle.

10. The method according to claim 9, wherein the determining that a road is a narrow road includes:
  generating a plurality of circular arcs having different lengths drawn in front of the vehicle, and setting a center of a rear wheel shaft of the vehicle to 0°;
  calculating a narrow road detecting region;
  extracting arcs which do not contact obstacles within the calculated region, the extracted arcs being a candidate group;
  selecting a circular arc closest to a middle of obstacles at both sides of a road from the extracted candidate group;
  generating an offset curve, which is a circular arc having the same central point as the selected circular arc and contacting a corresponding obstacle at left/right sides of the selected circular arc, and then calculating the width between the two offset curves; and
  determining that a road is a narrow road when the calculated width does not exceed a threshold value.

11. The method according to claim 10, wherein the calculating the width includes:
  generating a first offset curve which has a minimum radius among radii of arcs having the same central point as the selected circular arc and contacting a first obstacle at the left side of the selected circular arc;
  generating a second offset curve which has a maximum radius among radii of arcs having the same central point as the selected circular arc and contacting a second obstacle at the right side of the selected circular arc; and
  calculating a width between the first offset curve and the second offset curve.

12. The method according to claim 11, wherein in the calculating the width, a radius of the first offset curve is determined by using a distance between a line representing the first obstacle and a central point of the first offset curve at the time of generating the first offset curve.

13. The method according to claim 11, wherein in the calculating the width, a radius of the second offset curve is determined by using a distance between a point representing the second obstacle and a central point of the second offset curve at the time of generating the second offset curve.

* * * * *